United States Patent [19]
Davies et al.

[11] Patent Number: 5,200,585
[45] Date of Patent: Apr. 6, 1993

[54] DRAWOUT SWITCHGEAR WITH IMPROVED LEVERING-IN MECHANISM AND INTERLOCK

[75] Inventors: Norman Davies, Penn Township, Westmoreland County; Stanislaw A. Milianowicz, Monroeville; Nagar J. Patel, Plum Boro; Edward J. Klimek, Jeannette, all of Pa.

[73] Assignee: Westinghouse Electric Corp., Pittsburgh, Pa.

[21] Appl. No.: 788,705

[22] Filed: Nov. 6, 1991

[51] Int. Cl.[5] .............................................. H01H 9/20
[52] U.S. Cl. ................................................. 200/50 AA
[58] Field of Search ....................... 200/50 A, 50 AA; 361/331-345

[56] References Cited

U.S. PATENT DOCUMENTS

| | | | |
|---|---|---|---|
| 3,474,201 | 10/1969 | Bould | 200/50 A |
| 3,578,925 | 5/1971 | Drown et al. | 200/50 AA |
| 3,783,209 | 1/1974 | Cleaveland et al. | 200/50 AA |
| 4,002,865 | 1/1977 | Kuhn et al. | 200/50 AA |
| 4,017,698 | 4/1977 | Kuhn et al. | 200/50 AA |
| 4,112,269 | 9/1978 | Nelson et al. | 200/50 AA |
| 4,396,813 | 8/1983 | Hesselbart et al. | 200/50 AA |
| 5,097,382 | 3/1992 | Leach et al. | 361/345 |

OTHER PUBLICATIONS

IB 33-790 IF-Instructions for Low-Voltage Power Circuit Breakers Types DS and DSL-Westinghouse Electric Corporation-Oct. 1983.

*Primary Examiner*—J. R. Scott
*Attorney, Agent, or Firm*—M. J. Moran

[57] ABSTRACT

A circuit breaker, and method of constructing same, in which a levering-in mechanism may be added after the circuit breaker has been assembled. The circuit breaker includes a chassis having first and second side plates which define upwardly open slots, which enable the levering-in mechanism to be "dropped in" to the correct position of an assembled circuit breaker, with bottom portions of the slots functioning as half bearings. First and second retainer plates with downwardly open slots are respectively attached to the first and second side plates, to complete the half bearings and hold the levering-in assembly. The levering-in mechanism includes a threaded shaft having a traveling nut, with a bushing on the shaft being held radially, but not axially, by a bracket member, with the bushing also functioning as a non-stress stop for the traveling nut. New interlock arrangements are also associated with the levering-in mechanism, including interlocks which: (1) prevent access to the levering-in mechanism, (2) place the circuit breaker in a trip-free condition, and (3) discharge closing spring, in response to predetermined conditions.

23 Claims, 13 Drawing Sheets

FIG.11

DRAWOUT SWITCHGEAR WITH IMPROVED LEVERING-IN MECHANISM AND INTERLOCK

TECHNICAL FIELD

The invention relates in general to metal enclosed drawout switchgear apparatus, and more specifically to improved levering-in mechanisms for such apparatus.

BACKGROUND ART

Prior art levering-in mechanisms for drawout switchgear include an arrangement in which a crank engages the end of a first shaft, with rotation of the first shaft being translated to rotary motion of a second shaft oriented perpendicular to the first shaft. The translating means conventionally utilizes a worm gear on the first shaft and a cooperative main gear on the second shaft. The second shaft has crank arms fixed to its ends, and rollers on the crank arms engage cradles fixed to the walls of a circuit breaker cell. Thus, when the first shaft is rotated, the second shaft is also rotated, with the rollers on the crank arms engaging the fixed cradles to either advance the circuit breaker from a disconnected position to a connected position, or from a connected position to a disconnected position, depending upon the direction of crank rotation. U.S. Pat. Nos. 3,474,201; 3,578,925; 4,002,865; and 4,017,698, which are assigned to the same assignee as the present application, all disclose levering-in mechanisms utilizing the worm-main gear drive arrangement.

Some prior art levering-in mechanisms utilize a traveling nut on the first shaft, with movement of the traveling nut being translated to movement of the circuit breaker between connected and disconnected positions. U.S. Pat. No. 3,783,209, which is assigned to the same assignee as the present application discloses a first example of a traveling nut arrangement in which a box beam on the front wall of a circuit breaker is removably fixed to the walls of a circuit breaker cell when the circuit breaker is initially positioned in the cell. A threaded shaft with a traveling nut has one end of the shaft fixed to the box beam and the circuit breaker is attached to the traveling nut. Turning the threaded shaft with a crank moves the nut and circuit breaker between connected and disconnected positions.

Another example of a traveling nut arrangement is disclosed in U.S. Pat. No. 4,112,269, which is assigned to the same assignee as the present application, with the levering-in arrangement of this patent attaching a shaft with a traveling nut to the wall of a circuit breaker cell. Turning the shaft with a crank moves the traveling nut, with the traveling nut engaging a first end of a pivotally mounted cam. The cam has a second end which engages a pin on the circuit breaker chassis, to move the circuit breaker between connected and disconnected positions.

While these prior art levering-in mechanisms function well, all require special levering-in apparatus which is costly to manufacture, assemble and adjust. Also, some circuit breakers require levering-in mechanisms and some do not, depending upon their application. In the prior art circuit breakers of which we are aware, both types of circuit breakers, those for fixed applications, and those for levering-in applications, must be manufactured and stocked, as circuit breakers of which we are aware cannot be easily modified to add levering-in, once assembled.

Thus, it would be desirable, and it is an object of the invention, to simplify the manufacturing and assembly of levering-in mechanisms. It would also be desirable, and it is another object of the invention, to be able to add a levering-in mechanism to a completed circuit breaker, making it unnecessary to manufacture and stock circuit breakers for fixed applications, and circuit breakers for levering-in applications.

SUMMARY OF THE INVENTION

The invention is a new and improved circuit breaker comprising a chassis having first and second side plates, a levering-in mechanism which includes first and second shafts having orthogonal axes, and translating means for translating rotation of the first shaft to rotation of the second shaft. The first and second side plates each define an upwardly open slot having a bottom portion, with the bottom portions journally supporting the second shaft. First and second retainer plates are respectively fixed to the first and second chassis side plates, with the first and second retainer plates defining downwardly open slots through which the second shaft extends. This construction enables the levering-in mechanism to be lowered into the first and second slots after assembly of the circuit breaker, on circuit breakers which require a levering-in function.

The invention also includes a method of providing a levering-in function for an assembled circuit breaker having a chassis which includes first and second upstanding side plates. The method includes the steps of providing a levering-in sub-assembly which includes a levering-in shaft having first and second ends, providing first and second upwardly open slots in the first and second chassis side plates, lowering the levering-in sub-assembly into the first and second slots with the bottoms of the first and second slots supporting the levering shaft and functioning as first and second half bearings, and lastly the step of completing the first and second half bearings to hold the levering shaft at the bottoms of the first and second slots.

BRIEF DESCRIPTION OF THE DRAWINGS

The invention will become more apparent by reading the following detailed description in conjunction with the drawings, which are shown by way of example only, wherein:

FIG. 11 is a side elevational view of the circuit breaker shown in FIG. 1, similar to the view shown in FIG. 14, except with the circuit breaker being illustrated in a closed position;

DESCRIPTION OF PREFERRED EMBODIMENTS

Figure 1:
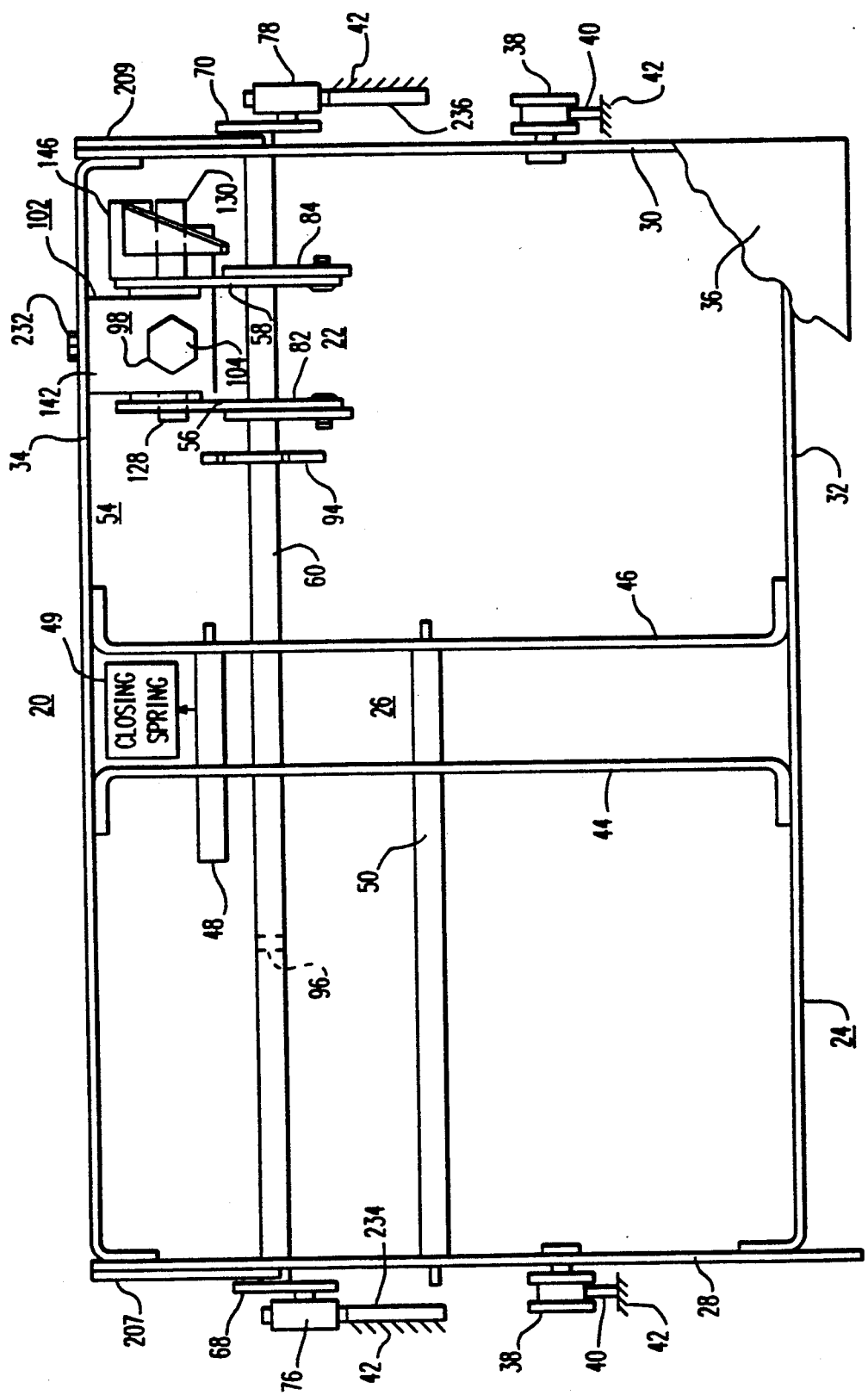
FIG. 1 is a front elevational view of a circuit breaker with most of a front panel removed, and other parts not shown, in order to illustrate a levering-in mechanism constructed according to the teachings of the invention.

Referring now to the drawings, and to FIG. 1 in particular, there is shown a front elevational view of a circuit breaker 20, with most of a front panel removed and certain other components not shown, illustrating a levering-in mechanism 22 constructed according to the teachings of the invention. Circuit breaker 20 is an AC power circuit breaker of the type which is usually supplied as part of low voltage metal enclosed switchgear of drawout type, but it may also be supplied in a fixed mounted version. The levering-in mechanism 22 of the invention may be added to circuit breaker 20 after assembly of the circuit breaker, and thus drawout and fixed mount circuit breakers do not have to be manufactured and stocked.

Figure 10:
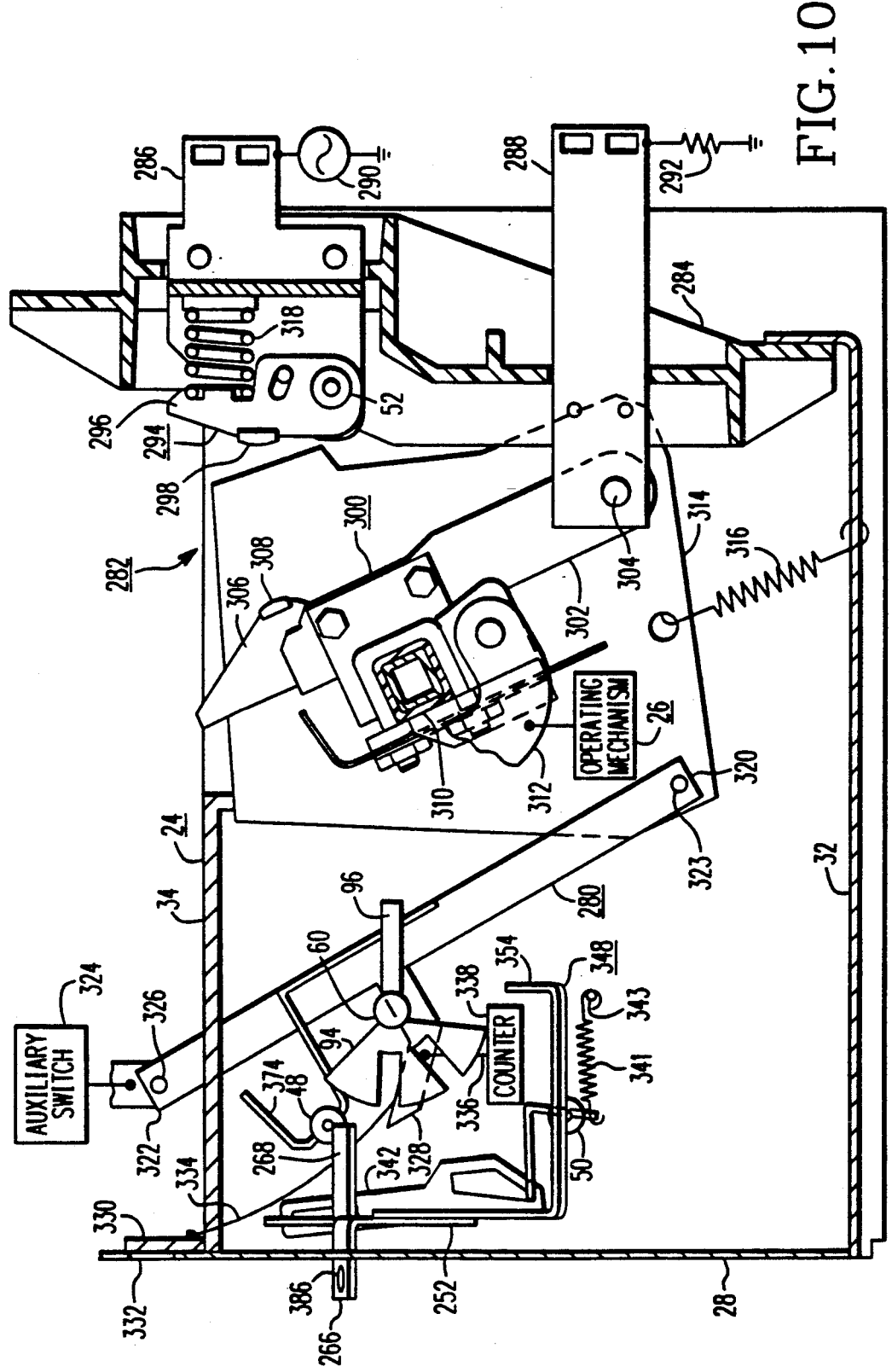
FIG. 10 is a side elevational view of the circuit breaker shown in FIG. 1, including the interlock functions shown in FIG. 9, and with the circuit breaker in an open position.
Figure 11:
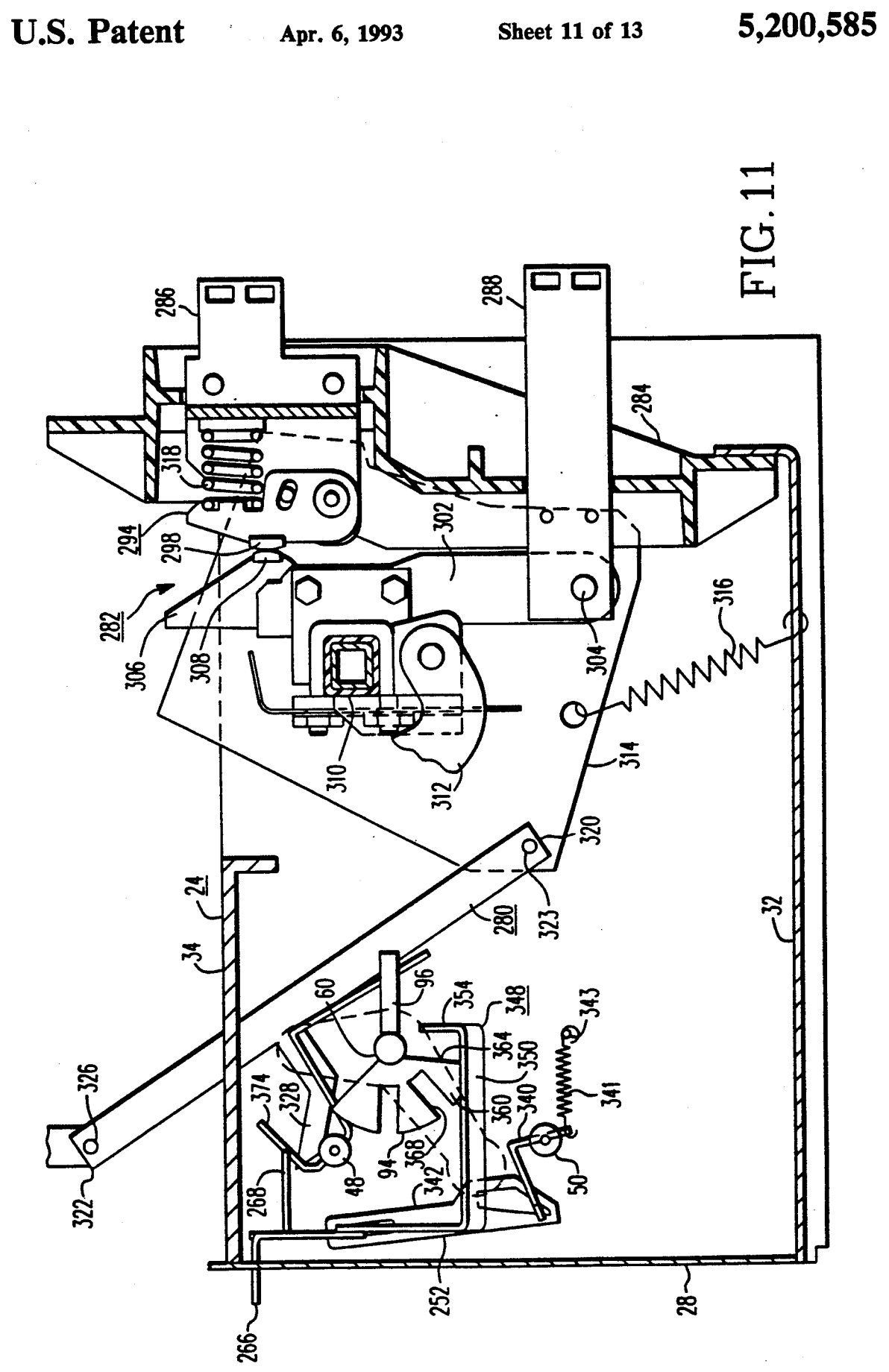
Figure 13:
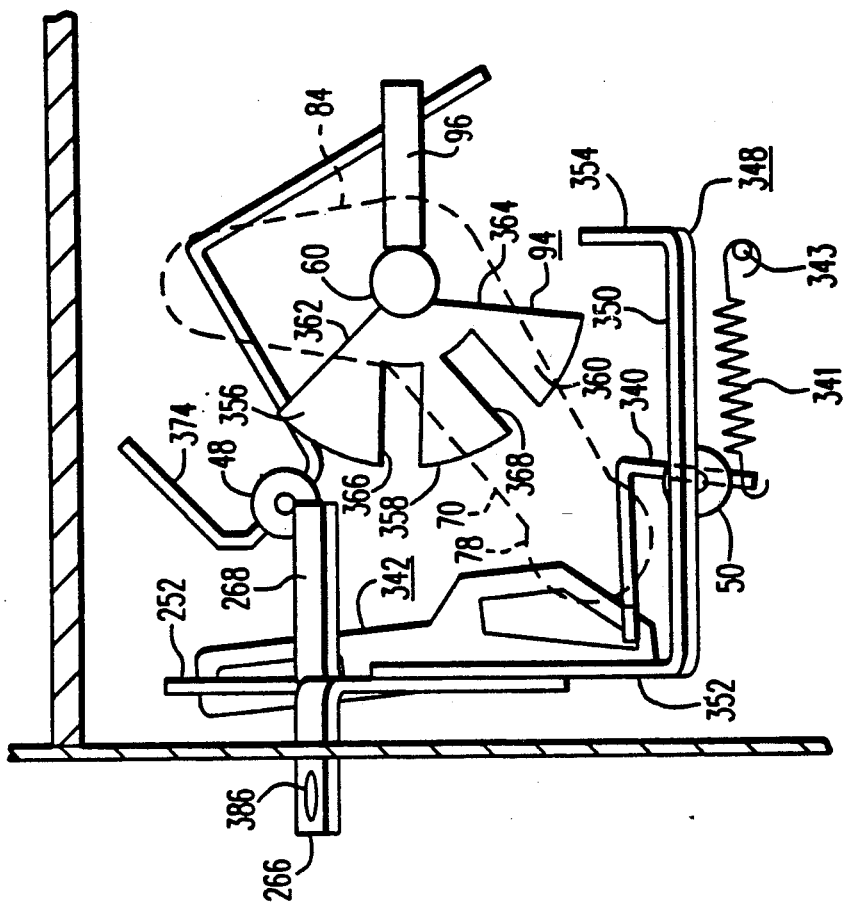
FIG. 13 is a side elevational view of the interlock functions shown in FIG. 9, with the shutter in the actuated, un-blocking position.

Circuit breaker 20 includes a chassis 24 which supports all of the circuit breaker components which include an operating mechanism 26, the levering-in device or mechanism 22, and three insulated pole unit assemblies, one of which is shown in FIGS. 10 and 11. Only those parts of the operating mechanism 26 important to the present invention are shown. A complete operating mechanism suitable for operating mechanism 26 is shown and claimed in co-pending application Ser. No. 07/788,707 filed Nov. 6, 1991, entitled "Circuit Interrupter Having Improved Operating Mechanism".

Circuit breaker chassis 24 includes first and second upstanding metallic side plates 28 and 30, respectively, a metallic bottom pan 32, a metallic top pan 34, and a front panel 36, only a portion of which is shown. A pair of rollers 38 are provided on each chassis side plate 28 and 30 for supporting circuit breaker 20 on rails 40, of an associated circuit breaker compartment or cell 42, as the circuit breaker 20 is moved between four positions, i.e., (1) a remove position, (2) a disconnect position, (3) a test position, and (4) a connect position, by levering-in mechanism 22.

Operating mechanism 26 includes first and second upstanding support plates 44 and 46 which extend between the bottom and top pans 32 and 34, a "close" shaft 48, and an "open" or trip shaft 50. As will be hereinafter explained, the close shaft 48 is rotated about its axis to discharge a closing spring 49, charged by operating mechanism 26, when it is desired to close electrical contacts of circuit breaker 20. The open shaft 50 is rotated about its axis to open the electrical contacts of the circuit breaker.

Levering-in mechanism 22 is manufactured as a complete sub-assembly, enabling it to be added to circuit breaker 20 after assembly of the circuit breaker. The levering-in sub-assembly 22 includes a one-piece weldment 52 shown in perspective in FIG. 2, and a screw-nut arrangement 54 shown in an exploded perspective view in FIG. 3. The screw-nut arrangement 54 is linked to the weldment 52 via first and second levering-in link members 56 and 58, shown in FIGS. 2 and 3.

Figure 2:
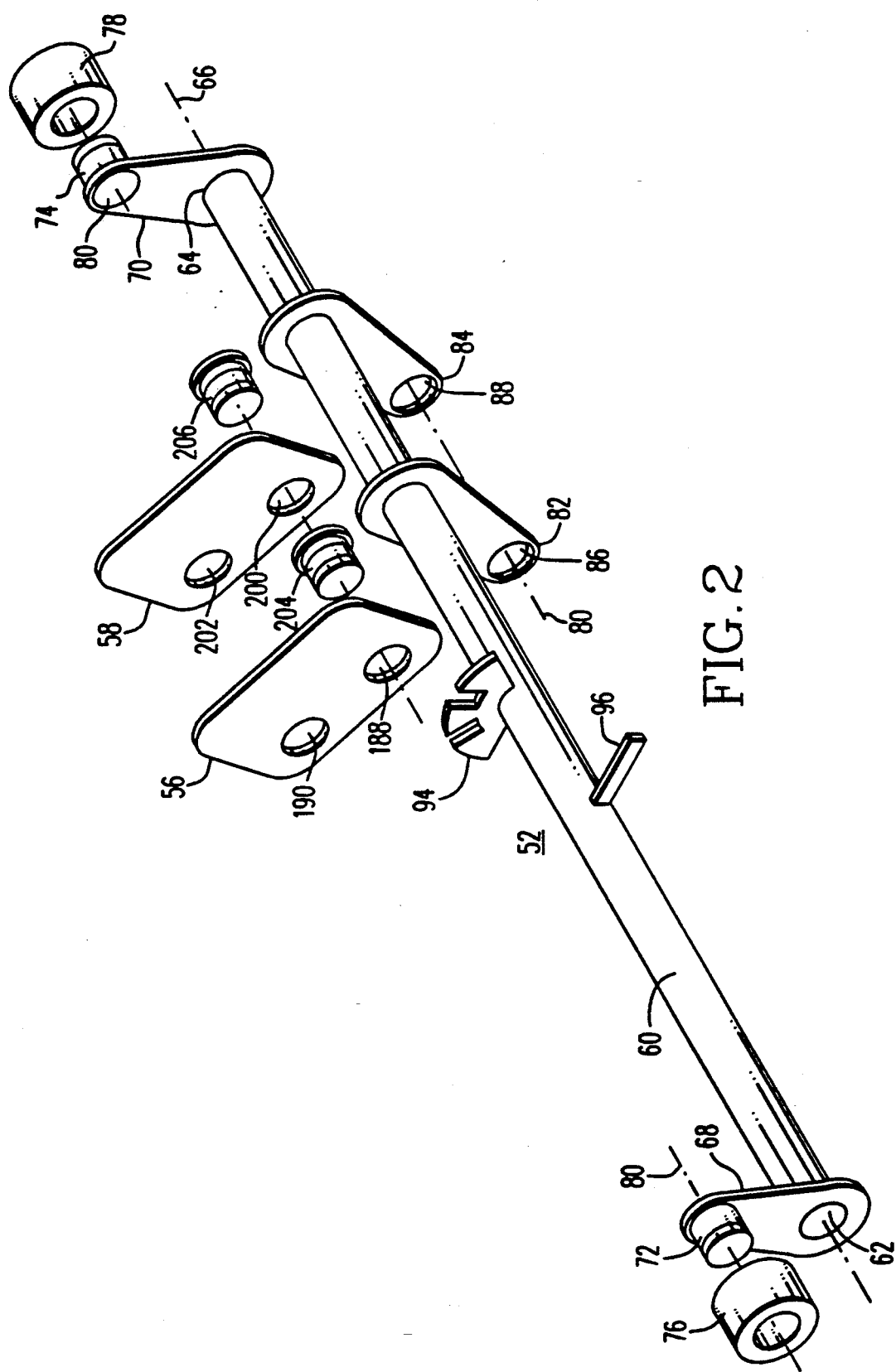
FIG. 2 is a perspective view of a one-piece welded assembly which is part of the levering-in mechanism shown in FIG. 1.

Referring now to FIG. 2, weldment 52 includes a levering-in shaft 60 having first and second ends 62 and 64, and a longitudinal axis 66 which extends between its ends. First and second crank arms 68 and 70 have first ends which are respectively welded to the first and second ends 62 and 64 of levering-in shaft 60, and second ends which have roller pins 72 and 74 welded thereto. First and second rollers 76 and 78 are respectively attached to the roller pins 72 and 74. Crank arms 68 and 70 have like orientations relative to levering-in shaft 60, such that a longitudinal axis 80 is common to both roller pins 72 and 74.

First and second drive links 82 and 84 have first ends welded in spaced relation to predetermined locations of levering-in shaft 60, and second ends defining openings 86 and 88. The first and second drive links 82 and 84 have like orientations relative to levering-in shaft 60, such that a longitudinal axis 90 is common with the centers of both openings 86 and 88. The first and second drive links 82 and 84 have a predetermined angular relationship with the first and second crank arms 68 and 70, such as an angle of about 135 degrees, for example, indicated at 92 in FIG. 6.

An interlock cam 94 and an interlock bar 96 are welded to predetermined locations on levering-in shaft 60, for purposes which will be hereinafter explained. The invention enables a one-piece weldment 52 to be used for the components of levering-in mechanism 22 which are angularly related to levering-in shaft 60, and to one another, eliminating time consuming pinning together of such components. Also the one-piece weldment 52 eliminates the looseness which would result in such an assembly due to the tolerances of the parts, if they were pinned together. Placing the levering-in mechanism near the top of circuit breaker 20, and an unique method of installing the levering-in mechanism 22, all contribute to the ability to utilize weldment 52.

Figure 3:
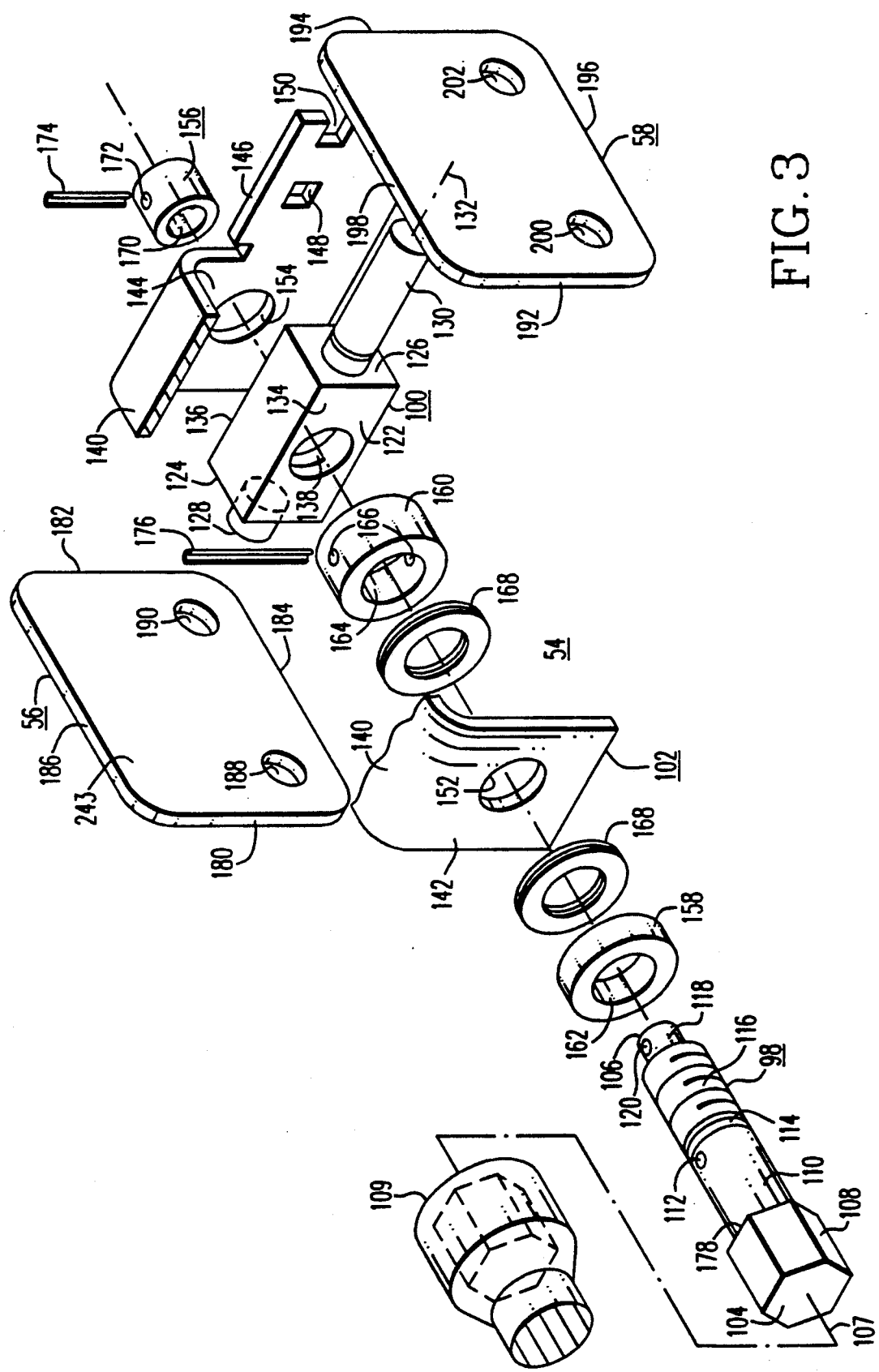
FIG. 3 is an exploded perspective view of the levering-in mechanism shown in FIG. 1, without the welded assembly shown in FIG. 2.

Referring now to FIG. 3, screw-nut arrangement 54 includes a shaft 98, a traveling nut 100, and a bracket member 102. Shaft 98 has first and second ends 104 and 106, respectively, and a longitudinal axis 107 which extends between the ends. Shaft 98 has a first surface 108 having a first diameter, with the first surface 108 starting at the first end 104 and extending for a predetermined dimension towards the second end 106. The first surface 108 defines a hex shaped cross sectional configuration for receiving a crank 109. A second surface 110, having a second diameter which is slightly smaller than the first diameter, extends from the first surface 108 for a predetermined dimension towards the second end 106. The second surface 110 defines a smooth round configuration, and an opening 112 is provided through the second diameter of shaft 98. A circumferential groove 114 is provided at the end of the second surface 110, and a third surface 116 having a third diameter, which is about the same dimension as the second diameter, starts at groove 114 and extends for a predetermined dimension towards the second end 106. The third surface 116 is threaded. A fourth surface 118 having a fourth diameter, which has a dimension less than the third diameter, extends to the second end 106 of shaft 98. An opening 120 is provided through the fourth diameter of shaft 98.

Traveling nut 100 includes a slightly elongated body portion 122 having first and second flat ends 124 and 126 from which first and second shaft or stud members 128 and 130 respectively extend on a common centerline 132. Body portion 122 further includes first and second flat, parallel faces 134 and 136, and a threaded opening 138 extends between faces 134 and 136. Threaded opening 138 is sized to threadably receive the threaded portion 116 of shaft 98.

Bracket member 102 has a substantially U-shaped cross sectional configuration which includes a bight 140 and first and second leg portions 142 and 144, respectively. The second leg portion 140 has an integral lateral extension 146 which defines an opening 148 and a notch 150. The first and second leg portions 142 and 144 respectively define first and second openings 152 and 154, with opening 152 being dimensioned to receive the second diameter defined by the second surface 110 of shaft 98, and with opening 154 being dimensioned to slidably receive a stop bushing or collar 156. Two additional bushing or collar members 158 and 160 are provided which have openings 162 and 164, respectively, dimensioned to receive the second diameter defined by the second surface 110 of shaft 98. Bushing 160 additionally has small aligned openings 166 through opposite walls thereof. A plurality of thrust washers 168 complete the hardware required for the screw-nut arrangement 54 shown in FIG. 3.

Figure 6:
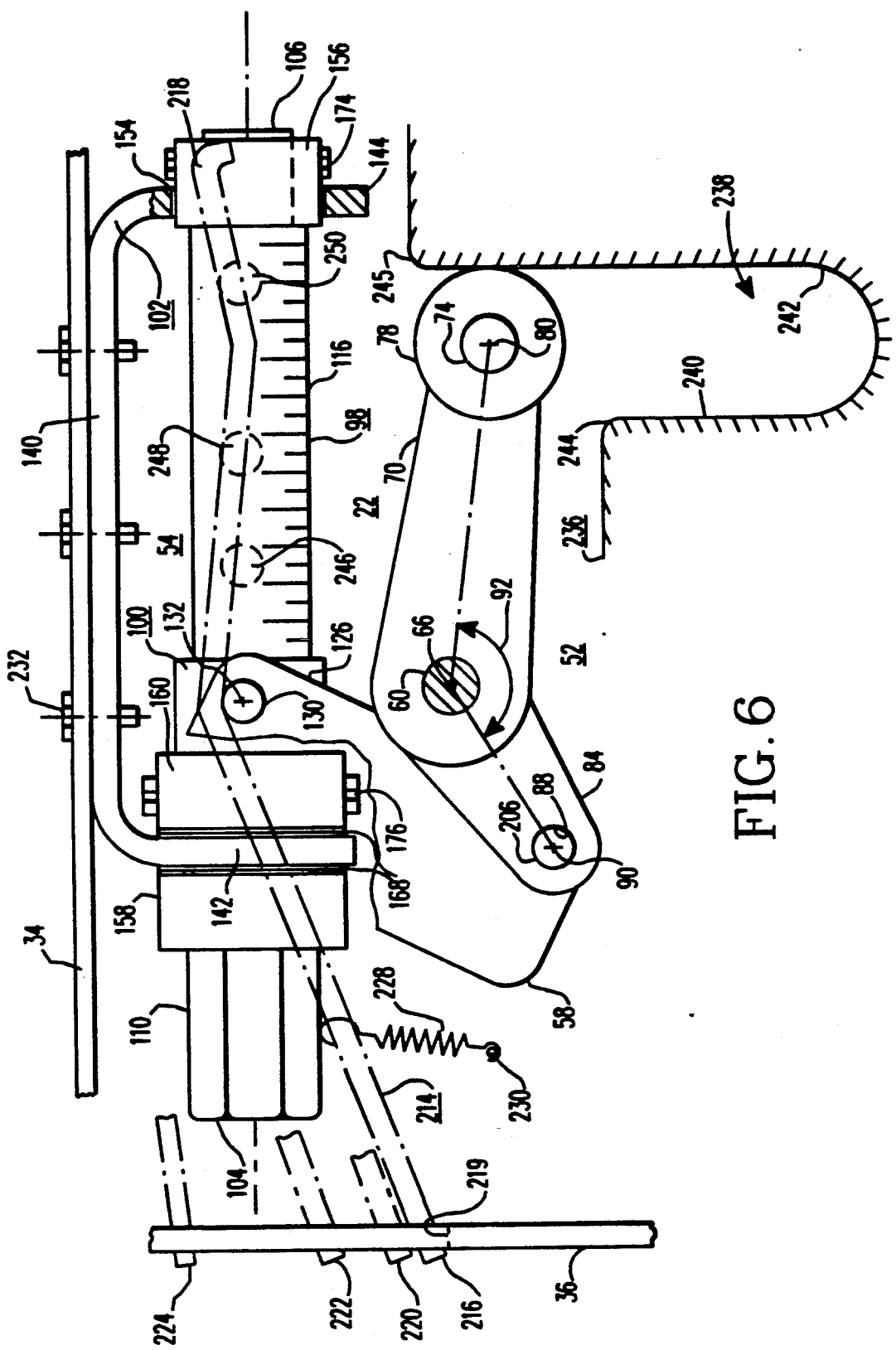
FIG. 6 is a side elevational view of the levering-in mechanism shown in FIG. 5, illustrating the levering-in mechanism in a configuration which results in the associated circuit breaker being in a fully disconnected position.

In the assembly of the screw-nut arrangement 54, best shown in a side elevational view of levering-in mechanism 22 in FIG. 6, bushing 158 and a pair of thrust washers 168 are disposed on surface 110 of shaft 98, and the second end 106 of shaft 98 is advanced through opening 152 in the first leg 142 of bracket member 102. A pair of thrust washers 168 and bushing 160 are then telescoped over the second end 106 of shaft 98, and shaft 98 is then threadably engaged with traveling stop nut 100 by turning shaft to advance stop nut 100 towards the first end 104 of shaft 98.

Stop bushing 1 56, which has an opening 170 dimensioned to receive the diameter of shaft 98 defined by the fourth surface 118, may then be placed on the fourth surface 118, and shaft 98 advanced such that the stop bushing 156 enters opening 154; or, alternatively, stop bushing may be placed on the second end 106 of shaft 98 after the second end 106 of shaft 98 has been advanced into opening 154, as desired. Stop bushing 156, which additionally has small openings 172 through its walls, is rotated to align openings 172 with opening 120 through the fourth diameter defined by surface 118, and a spring pin 174 is forced into the aligned openings to secure stop bushing 156 to shaft 98. In like manner, bushing 160 is rotated to align its openings 166 with opening 112 in shaft 98, and a spring pin 176 is forced into the aligned openings. Shaft 98 is now firmly secured to the first leg 142 of bracket member 102, between a shoulder 178, formed between the first and second surfaces 108 and 110, and spring pin 176. It will be noted that the second leg 144 of bracket member 102 provides radial support for shaft 98, but the stop bushing 156 is free to "float" in opening 154, i.e., move axially without any restraint from, or application of stress to, the second leg 144.

Levering-in links 56 and 58, best shown in FIGS. 2, 3 and 6, are flat metallic plates of like construction which have a generally rectangular configuration. Levering-in link 56 includes first and second ends 180 and 182 and lower and upper edges 184 and 186. First and second openings 188 and 190 are provided near the two lower corners defined by the intersection of the lower edge 184 and the first and second ends 180 and 182. In like manner, levering-in link 58 includes first and second ends 192 and 194 and lower and upper edges 196 and 198. First and second openings 200 and 202 are provided near the two lower corners defined by the intersection of the lower edge 196 and the first and second ends 192 and 194.

Levering-in link 56 is pivotally fixed to the relatively short shaft 128 of traveling nut 100 via opening 190 in link 56 and a suitable fastener, and levering-in link 58 is pivotally fixed to the longer shaft 130 of traveling nut 100 via opening 202 in link 58. The resulting assembly 54 is pivotally attached to weldment 52 by pivot pins 204 and 206. Pivot pin 204 is disposed in openings 188 and 86 of link 56 and drive link 82, respectively, and pivot pin 206 is disposed in openings 200 and 88 of link 58 and drive link 84, respectively.

Figure 4:
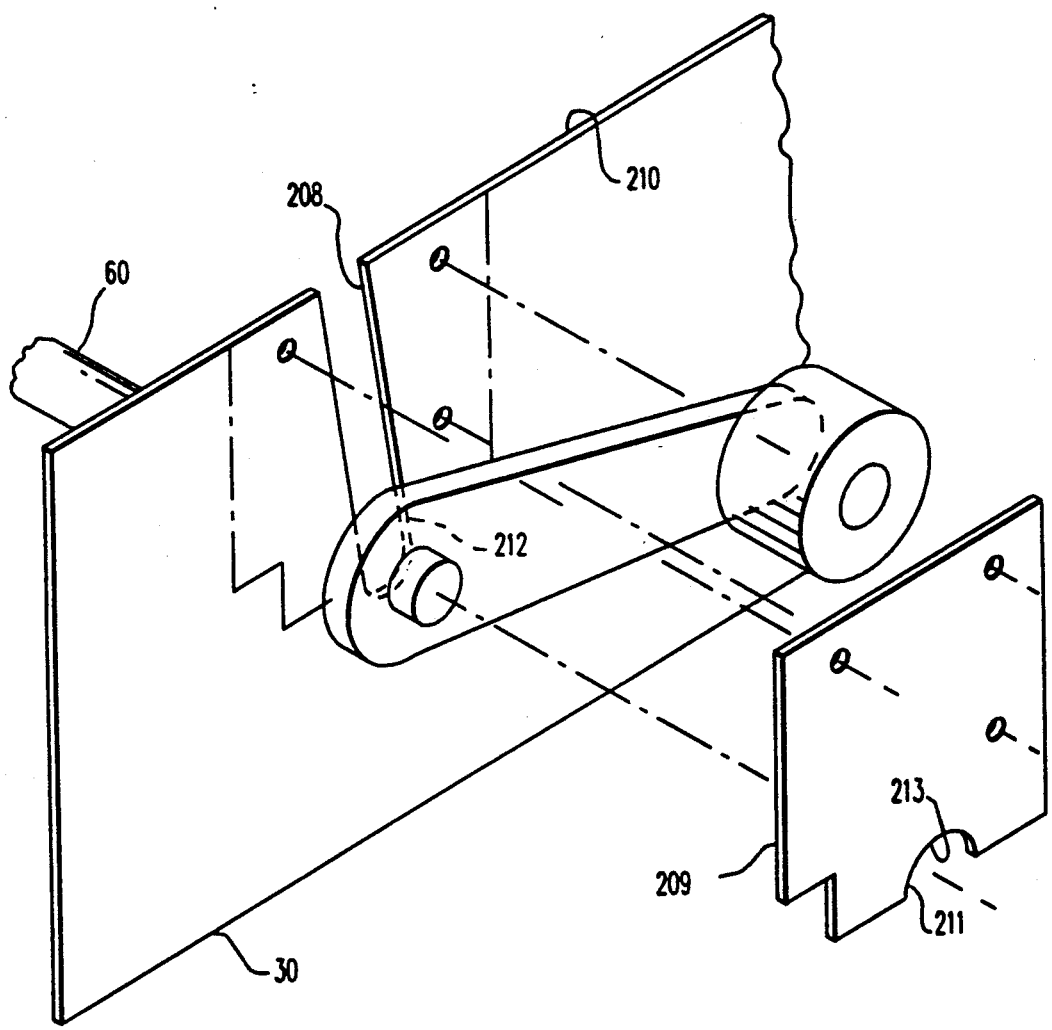
FIG. 4 is a fragmentary perspective view of one side of the circuit breaker chassis shown in FIG. 1, illustrating the "dropping in" of a levering-in mechanism according to methods and apparatus of the invention, which methods may be performed after assembly of a circuit breaker.

The first and second upstanding side plates 28 and 30 of chassis 24, as well as the support plates 44 and 46, are each provided with an upwardly open slot of like configuration and dimensions, such as slot 208 in upstanding side plate 30, as shown in a fragmentary perspective view in FIG. 4. Continuing with FIG. 4, slot 208 starts at an upper edge 210 of side plate 30 and continues downwardly to a curved bottom portion 212. Slot 208 has a width dimension selected to slidably receive the diameter of levering-in shaft 60, and the curved bottom portion 212 is dimensioned to function as a half-bearing for shaft 60. Circuit breaker 20 may be manufactured without the levering-in mechanism 22, and if circuit breaker 20 is ordered with the levering-in feature, the top pan 34 is temporarily removed from circuit breaker 20 and the levering-in sub-assembly 22 is lowered into the slots 208 of the first and second upstanding side plates 28 and 30 of chassis 24, which simultaneously lowers the assembly into like configured slots in the operating mechanism support plates 44 and 46. First and second retainer plates 207 and 209, shown in FIG. 1, are then fixed to the first and second side plates 28 and 30 with suitable fasteners to complete the half-bearings formed by the bottom portions 212 of slots 208 in the first and second side plates 28 and 30. Each side plate 207 and 209, such as side plate 209 shown in FIG. 4, has a downwardly open slot 211 having a curved upper portion 213 which rests against shaft 60 to provide an upper half-bearing, which, along with the lower half bearing formed by the bottom portions 212 of slots 208, firmly but rotatably secure the levering-in shaft 60 and its associated assembly 22 in the desired assembled position with circuit breaker 20.

Figure 5:
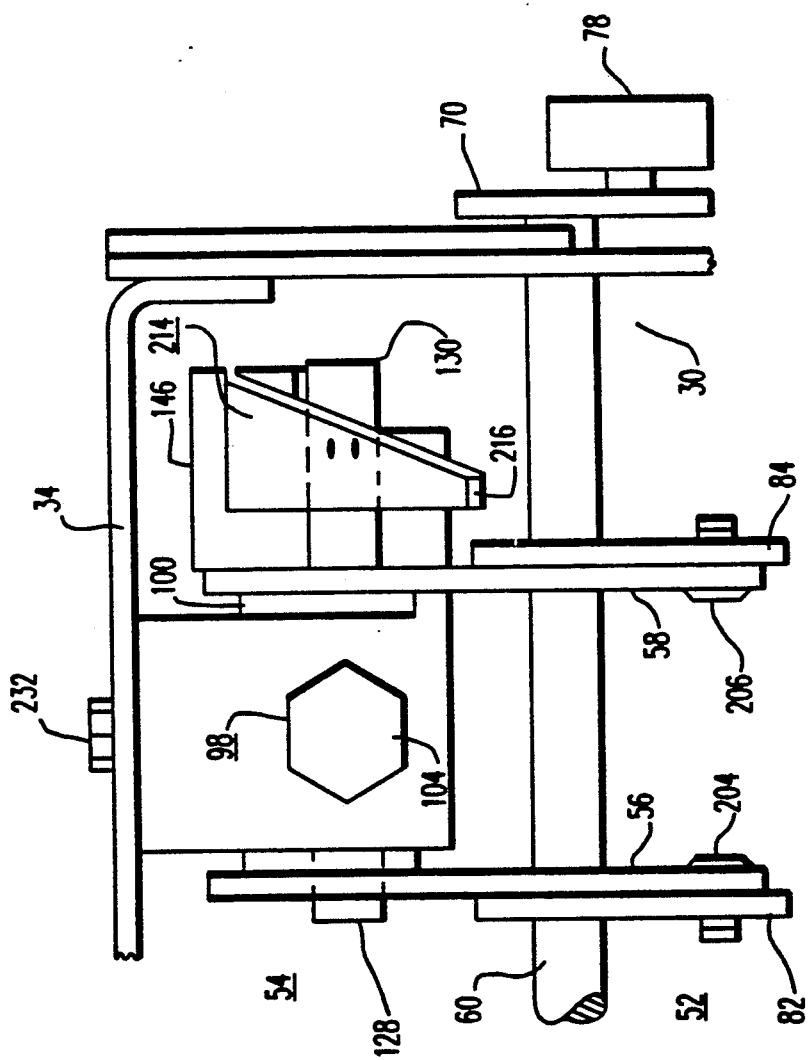
FIG. 5 is an enlarged elevational view of the levering-in mechanism shown in FIG. 1.

An elongated circuit breaker position indicator 214, best shown in FIGS. 5 and 6, may be provided at this point of the assembly, with the position indicator 214 having a pointer end 216 and a support end 218. The support end 218 of indicator 214 engages opening 148 and notch 150 in lateral extension 146 of bracket member 102. An intermediate portion of the indicator rests upon the upper surface of stud 130, and the pointer end 216 extends through a suitable slot 219 in the front panel 36. A legend is provided on front panel 36, adjacent to slot 219, which indicates the hereinbefore mentioned four positions of circuit breaker 20, i.e., the remove position indicated by the full outline of indicator 214 in FIG. 6, the disconnect position shown at 220, the test position shown at 222, and the connect position shown at 224.

Assembly of the levering-in assembly 22 is completed by connecting a tension spring 228 between indicator 214 and a fixed pin 230 on chassis 24, which biases the indicator end 216 downwardly, rollers 38 are bolted to the side plates 28 and 30, the top pan 34 is replaced, and fasteners 232 are inserted through openings in the top pan 34 which engage threaded openings in the bight 140 of bracket member 102, to firmly secure the screw-traveling nut arrangement 54 to chassis 24.

Levering-in assembly or mechanism 22 has a first shaft in the form of shaft 98, a second shaft in the form of levering-in shaft 60, and translating means in the form of traveling nut 100, levering-in links 56 and 58, and weldment 52, for translating rotation of the first shaft 98, such as provided by levering-in crank 109, to rotation of the second shaft 60.

As shown in FIG. 1, compartment or cell 42 is provided with first and second cradles 234 and 236 which are fastened to sides of compartment 42 adjacent to the rollers 76 and 78 of levering-in mechanism 22. FIGS. 5 and 6 illustrate levering-in mechanism 22 in the remove position, with FIG. 6 illustrating cradle 236. Since the interaction between roller 78 and cradle 236 is the same as the interaction between roller 76 and cradle 234, only the interaction between roller 78 and cradle 236 will be described.

More specifically, cradle 236 includes a slot 238 defined by first and second spaced vertical walls or surfaces 240 and 242. The upper edge of the first wall 240 terminates at a lower elevation, indicated at 244, than the upper termination 245 of the second wall 242. Thus, with the levering-in mechanism 22 in the remove position shown in FIGS. 5 and 6, the circuit breaker 20 may be pushed into compartment or cell 42 until rollers 76 and 78 contact the second wall 242.

It will be noted in FIG. 6 that in the remove position, traveling nut 100 is in a forward position on shaft 98, closely adjacent to, or contacting, bushing 160. Rotating shaft 98 clockwise with levering-in crank 109 causes traveling nut 100 to move towards the second end 106 of shaft 98. The flat surfaces of the levering-in links 56 and 58, such as flat surface 243 on link 56 shown in FIG. 3, are closely adjacent to the flat end surfaces 124 and 126 of traveling nut 100, maintaining traveling nut 100 in alignment and preventing any tendency for traveling nut 100 to rotate.

When traveling nut 100 reaches a first position, indicated by the broken outline 246 of shaft 130 in FIG. 6, circuit breaker 20 will be in the disconnect position. In the disconnect position, levering-in links 56 and 58 will have lifted sufficiently to rotate drive links 82 and 84, crank arms 68 and 70, and rollers 76 and 78 clockwise to a point where rollers 76 and 78 will be lowered in slots 238 of cradles 234 and 236 to a depth which prevents removal of circuit breaker 20 from its associated compartment 42. Main and auxiliary contacts of circuit breaker 20 will not have engaged with complementary main and auxiliary contacts of the compartment 42 at this point. The pointer end 216 of position indicator 214 will have been forced upwardly to position 220 by stud 130.

Continued clockwise rotation of shaft 98 will now force rollers 76 and 78 against the first walls 240 of cradles 234 and 236, forcing circuit breaker 20 to move towards the back of the associated compartment 42. When the traveling nut 100 reaches the position on shaft 98 indicated by the broken outline 248, the test position will have been reached, at which time auxiliary contacts on the circuit breaker will have made contact with auxiliary contacts in the breaker compartment 42, but the main breaker contacts will still be disconnected from the main contacts of the associated compartment 42. Circuit breaker 20 will be connected to an associated electrical control circuit, and various no-load test operations may be performed without actual engagement of the circuit breaker with power and load contacts. Position indicator 214 will have been raised to position 222, to indicate externally that circuit breaker 20 is in the test position.

Continued clockwise rotation of shaft 98 will continue to advance circuit breaker 20 towards the back of its associated compartment 42. When traveling nut 100 nears the end of its normal travel path, indicated by broken outline 250 in FIG. 6, and also by the side elevational view of leveling-in mechanism 22 shown in FIG. 7, the circuit breaker 20 will be in the connect position in which its main contacts will be in complete engagement with the main contacts of the associated compartment 42. As will be noted in FIG. 7, rollers 76 and 78 will have risen to near the top of wall 240. Stud 130 will have forced position indicator 214 to the uppermost or connect position, indicated at 224 in FIG. 6.

Continued clockwise rotation of shaft 98 will now be useless, as the circuit breaker 20 will be secure and fully connected to both the auxiliary and main contacts. Should shaft 98 be turned further in the clockwise direction, no damage will be caused to the bracket member 102 or other components of the levering-in mechanism 22 because the traveling nut 100 will be merely forced against the stop bushing 156, which is pinned to shaft 98. As hereinbefore stated, stop bushing 156 is merely provided with radial support by bracket member 102, with stop bushing 156 "floating" axially in opening 154. Thus, forcing traveling nut 100 against stop bushing 156 is similar to forcing a nut against the head of the associated bolt, resulting in no stresses being applied to the other operating components of the levering-in mechanism 22.

Figure 7:
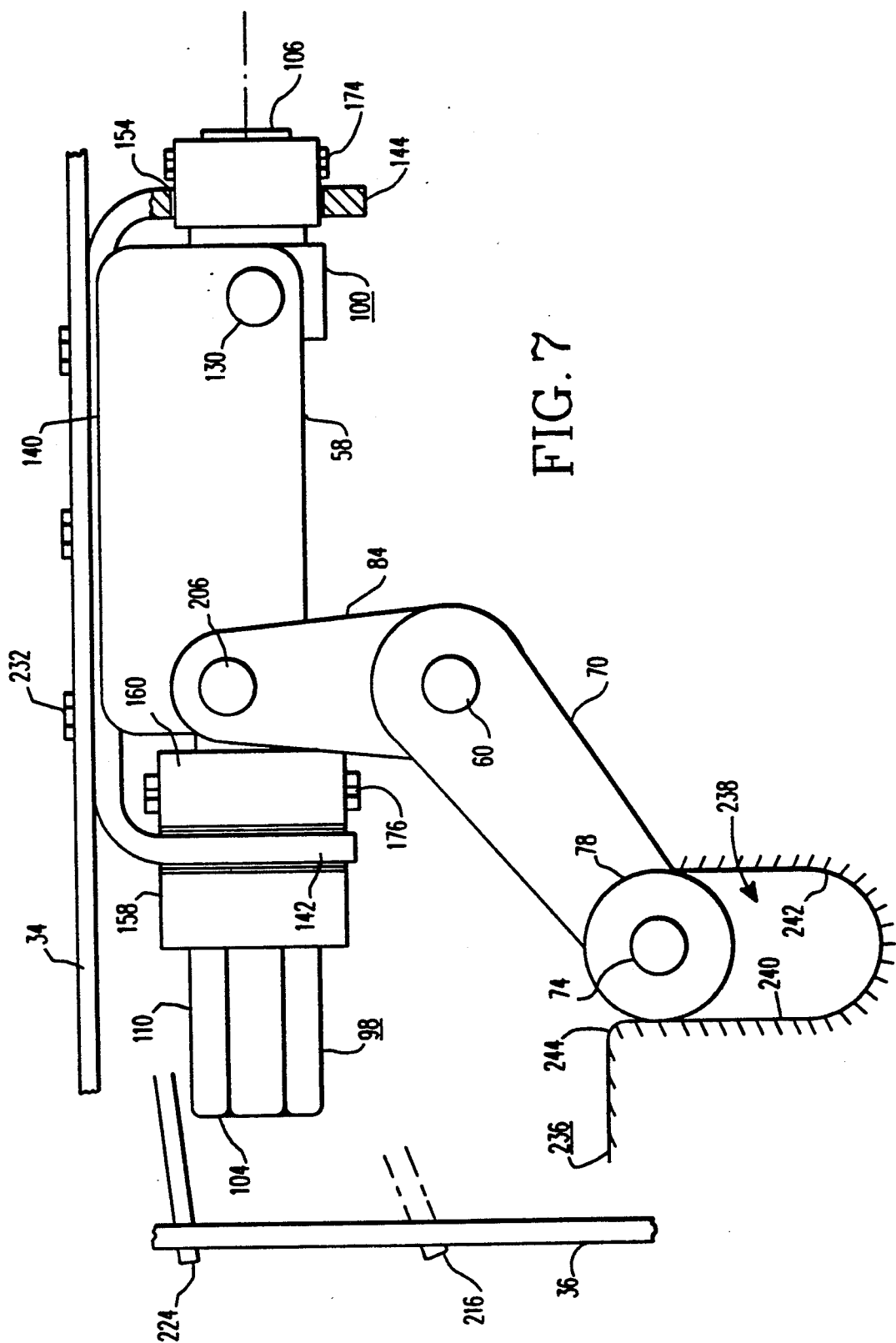
FIG. 7 is a side elevational view of the levering-in mechanism shown in FIG. 5, illustrating the levering-in mechanism in a configuration which results in the associated circuit breaker being in a fully connected position.

Turning shaft 98 counter clockwise will reverse the just described procedure, withdrawing circuit breaker 20 from the connect position shown in FIG. 7 to the test position, from the test position to the disconnect position, and from the disconnect position to the remove position shown in FIG. 6, at which point circuit breaker 20 may be removed from compartment 42.

Figure 8:
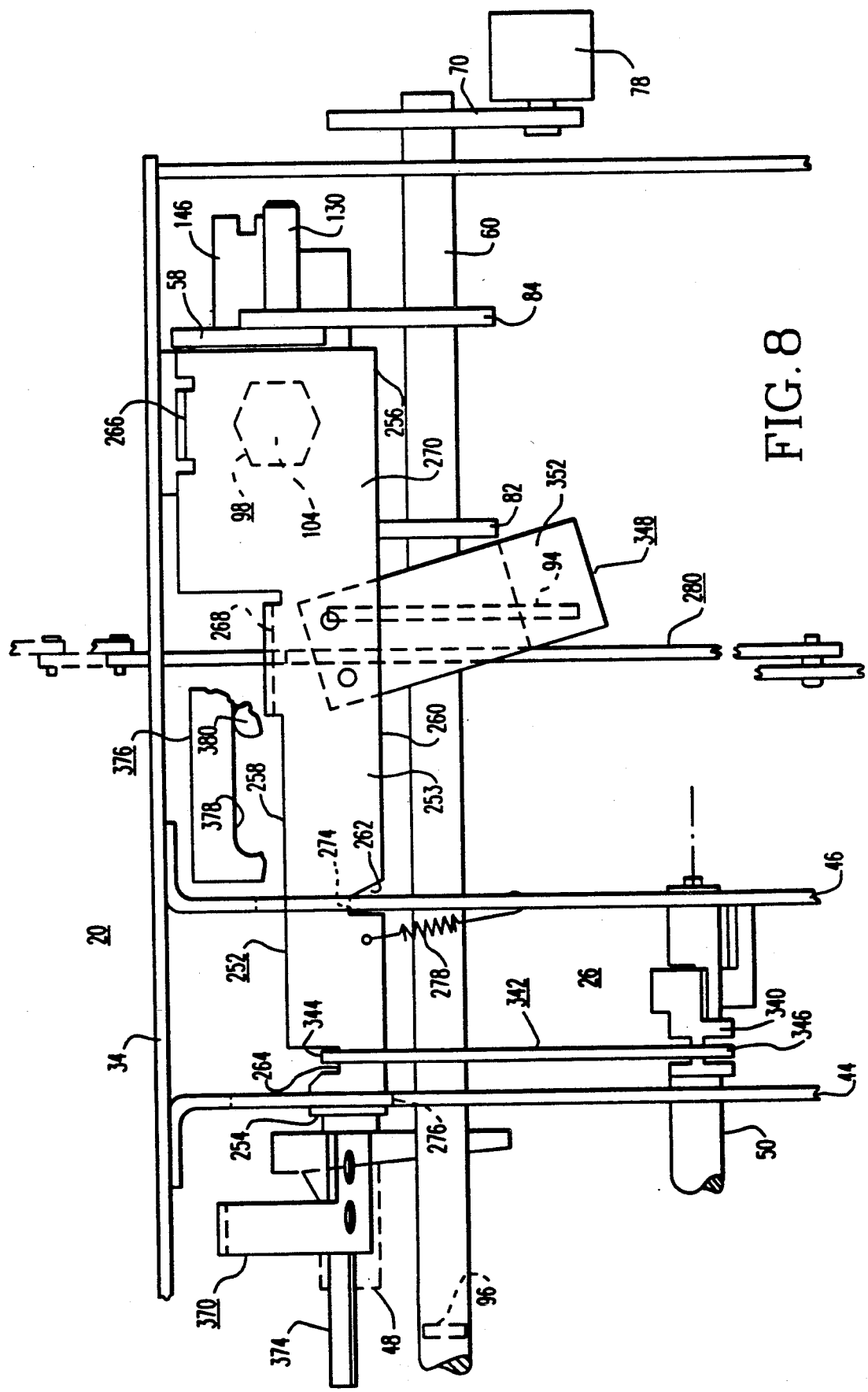
FIG. 8 is a fragmentary front elevational view of the circuit breaker shown in FIG. 1, illustrating certain of the interlocks which are associated with the levering-in function, including a shutter arrangement shown in an un-actuated position which blocks access to the levering-in function.

Circuit breaker 20 is provided with many mechanical interlocks associated with the levering-in function. FIG. 8 is a front elevational, fragmentary view of circuit breaker 20 with the levering-in interlocks shown. Circuit breaker 20 is illustrated in the "connect" position. A shutter 252 is provided which is pivotally mounted in front of the hex shaped first end 104 of shaft 98, blocking access to shaft 98 unless manually pivoted to an un-blocking position.

Figure 12:
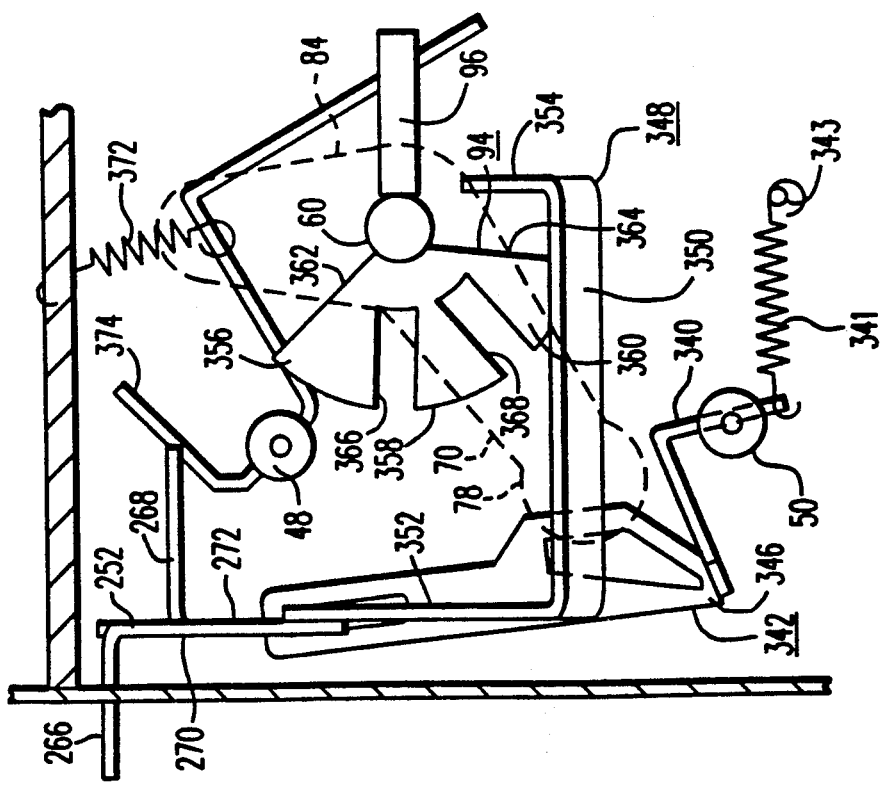
FIG. 12 is a side elevational view of the interlock functions shown in FIG. 8, with the shutter in the un-actuated blocking position and the associated circuit breaker in a fully connected position.

Shutter 252 has a flat elongated body portion 253 in the form of a metallic plate member having first and second ends 254 and 256, and upper and lower edges 258 and 260. The lower edge 260 is provided with a notch 262 located relatively closer to the first end 254 than to the second end 256, with the notch establishing a pivot point on the lower edge 260. The upper edge 258 is provided with a notch 264 which is closely adjacent to the first end 254. The upper edge 258 also includes first and second integral right angle tab members 266 and 268 which respectively extend outwardly from outer and inner flat surfaces 270 and 272. The first and second tab members 266 and 268 function as actuating and interlock tabs, respectively. The inner flat major surface 272 is best shown in FIG. 12, which is a side elevational view of the levering-in interlock functions.

The first end 254 of shutter 252 is inserted through aligned slots 274 and 276 in the operating mechanism support plates 46 and 44, respectively, with notch 262 resting upon the bottom edge of slot 274 in support plate 46. A tension spring 278 biases shutter 252 counter clockwise about a pivot point formed by notch 262 and slot 274, forcing the lower edge 260 of shutter 252 against the bottom edge of slot 276. In this position of shutter 252 the second end 256 of shutter 252 is biased upwardly, covering the hex shaped first end 104 of shaft 98.

Figure 9:
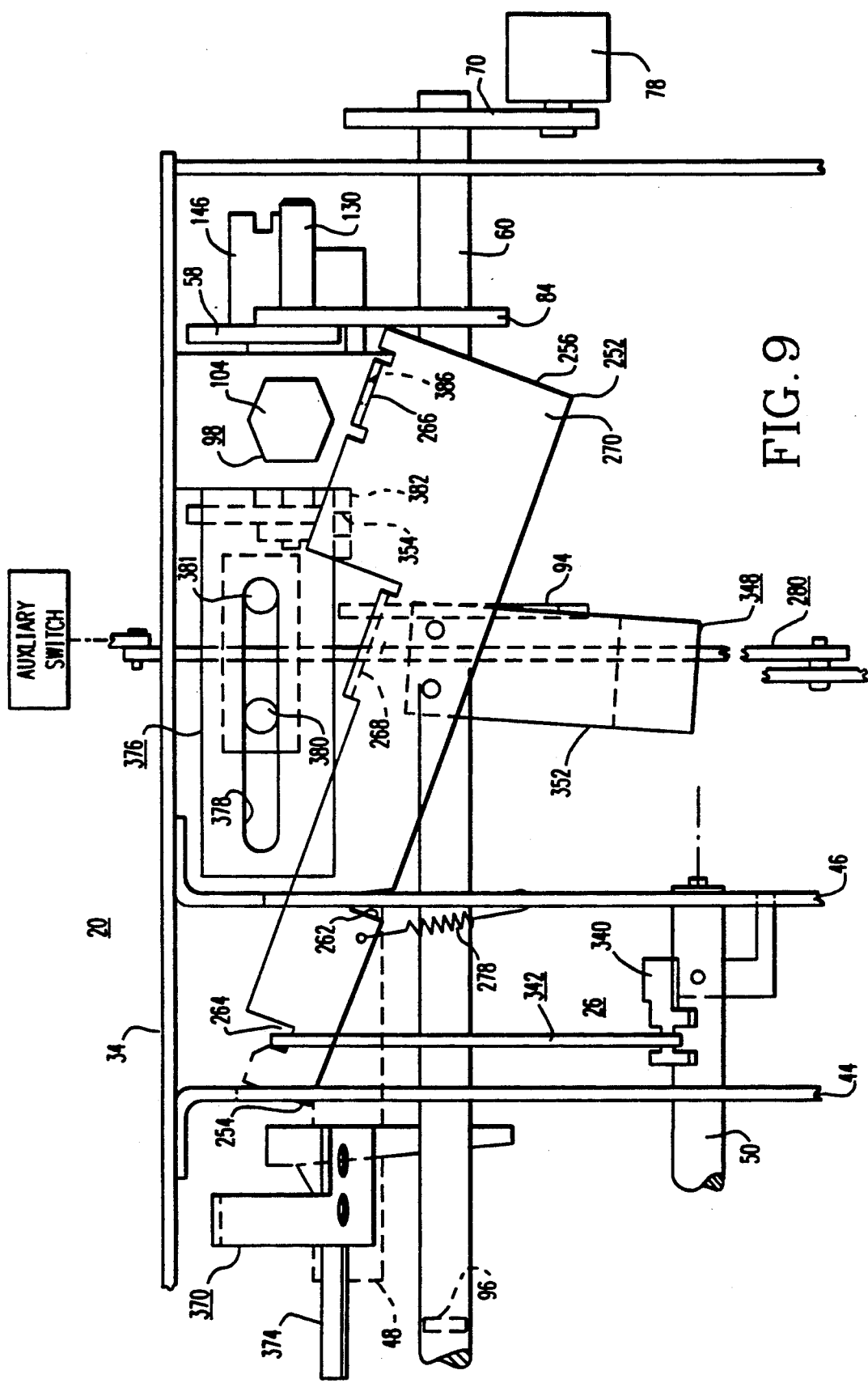
FIG. 9 is a fragmentary front elevational view of the circuit breaker shown in FIG. 1, similar to FIG. 8, except illustrating the shutter arrangement in an actuated position which enables access to the levering-in function.

FIG. 9 is an elevational view of circuit breaker 20, similar to FIG. 8 except illustrating shutter 252 in an actuated position, i.e., manually pivoted downward, to expose end 104 of shaft 98, with shutter 252 being actuated by the tab member 266 which extends outwardly from the outer flat surface 270 of shutter 252. In the position of shutter 252 shown in FIG. 8, levering-in crank 109 may be positioned over end 104 to crank circuit breaker outwardly from the connect position illustrated.

Circuit breaker 20 should not be cranked outwardly from the connect position when the main contacts of circuit breaker 20 are closed, however, as damaging arcing would occur. To prevent levering out from the connect position when the main contacts closed, a first interlock link 280 is provided. As best shown in FIGS. 10 and 11, the first interlock link 280 is positionally related to the open-closed condition of circuit breaker 20. Circuit breaker 20 includes three insulated pole unit assemblies 282, only one of which is shown since they are of similar construction. Each pole unit assembly 282 includes an insulative pole base 284 formed of a good electrical insulating material, such as a glass polyester, and upper and lower pole studs 286 and 288 for respective connection to a power source 290 and an electrical load 292 at the rear of the associated compartment 42, when the circuit breaker 20 is in the connect position.

A relatively stationary contact assembly 294 is connected to the upper pole stud 286, with the stationary contact assembly 294 including a contact head 296 which carries a main contact tip 298. A movable electrical contact assembly 300 includes a contact arm 302 which is pivotally mounted on the lower pole stud 288 via a pivot pin 304. A contact head 306, which carries a contact tip 308, is fixed to contact arm 302. An insulative drive bar arrangement 310 interconnects the movable contact assemblies 300 of the three pole units 282. Insulative links 312 interconnect the drive bar arrangement 310 to the circuit breaker operating mechanism 26. A plurality of insulative phase barrier members 314 are mounted on the drive bar arrangement 310, between and outside the three pole unit assemblies 282, and thus the phase barrier members 314 move with the movable contact assembly 300. Tension springs 316 interconnect certain of the insulative phase barrier members 314 and the bottom pan 32 of circuit breaker chassis 24, to bias the movable contact assembly 300 towards the open position, or counter clockwise as viewed in FIGS. 10 and 11. Springs 316, along with springs 318 mounted behind the relatively stationary contact assemblies 294, function as opening springs of circuit breaker 20.

The first interlock link 280 may conveniently be linked to an insulative phase barrier 314 which moves with movable contact assembly 300, to obtain the desired positional relationship with the movable contact assembly 300. The first interlock link 280 is an elongated metallic member having first and second ends 320 and 322, with the first end being pivotally connected to phase barrier 314 via a pivot pin 323, and with the second end 322 being pivotally connected to an auxiliary switch 324 via a pivot pin 326. Auxiliary switch 324 provides an electrical indication of the open-closed condition of circuit breaker 20.

The first interlock link 280 includes an outwardly extending interlock finger member 328. When circuit breaker 20 is open, as illustrated in FIG. 10, the end of interlock finger member 328 is pivoted downwardly into a non-interfering position. When circuit breaker 20 is closed, as illustrated in FIG. 11, the end of interlock finger member 328 is pivoted upwardly into a position just below the inwardly directed tab member 268. Thus, when the circuit breaker 20 is closed, an attempt to gain access to the crank end 104 of shaft 98 is blocked, as downward actuation of outwardly directed tab member 266 results in immediate contact of the inwardly directed tab member 268 with contact finger member 328 of the first interlock link 280. To gain access to shaft 98 thus requires that circuit breaker 20 be tripped by pressing the normal trip means located on the front panel of circuit breaker 20. As illustrated in FIG. 10, the first interlock link 280 may also operate a manually operated open-close indicator 330 which is vertically slidable behind an aperture 332 in front panel 28. A stiff wire 334 links finger member 328 with indicator 330. A stiff wire 336 may also link finger member 328 with a counter 338 which counts the operations of circuit breaker 20.

Returning to FIGS. 8 and 9, once circuit breaker 20 is open, shutter 252 may be manually pivoted to an actuated position to expose the crank end 104 of shaft 98. This action of exposing crank end 104 automatically places circuit breaker 20 in a trip-free condition, i.e., any attempt to close the open circuit breaker will discharge the closing springs of operating mechanism 26 without moving the open movable contact assembly 300. This function is accomplished by providing a trigger member 340 on the open shaft 50, and a trigger link 342 which has a first end 344 linked to shutter 252 via notch 264, and a second end 346 linked to trigger member 340. As illustrated in FIG. 12, open shaft 50 is biased counter clockwise, such as by connecting a tension spring 341 between trigger member 340 and a point 343 on chassis 24. Thus, pivoting shutter 252 downwardly to enable the levering-in function automatically rotates the open shaft 50 clockwise to the open or trip orientation, preventing circuit breaker 20 from being closed while the levering-in function is enabled.

It is desirable to be able to remove levering-in crank 109 and return shutter 252 to the normal or unactuated blocking position shown in FIG. 8 when circuit breaker is in any of the four positions, i.e., remove, disconnect, test, and connect, but circuit breaker 20 should be maintained in a trip-free condition when it is between any of the four positions. This is accomplished by cam interlock member 94 which is fixed to the levering-in shaft 60, and by a bracket member 348. Bracket member 348 has a substantially U-shaped configuration which includes a bight 350 and first and second legs 352 and 354. The first leg 352 is suitably fixed to the inner surface 272 of shutter 252. The second leg 354 cooperates with interlock cam 94 to prevent return of shutter 252 to the blocking position shown in FIG. 8 when circuit breaker 20 is between any of the four positions.

Figure 14:
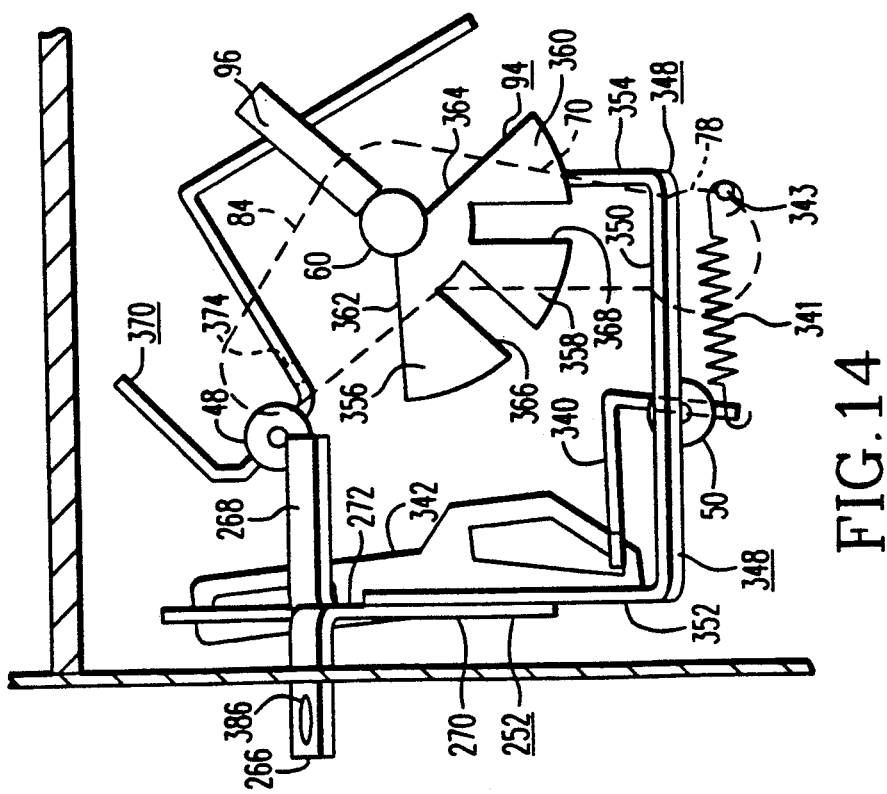
FIG. 14 is a side elevational view of the interlock functions shown in FIG. 9, illustrating the interlocks when the associated circuit breaker is between a "connect" position and a "test" position.

Interlock cam 94, as best shown in the side elevational views of FIGS. 12, 13, 14 and 15, includes first, second and third cam lobes 356, 358 and 360, with the first and third cam lobes having outer edges 362 and 364. The first and second cam lobes 356 and 358 are separated by a slot 366 and the second and third cam lobes 358 and 360 are separated by a slot 368. When circuit breaker 20 is in the connect position shown in FIGS. 12 and 13, the second leg member 354 of bracket member 348 will be adjacent to edge 364 of the third cam lobe 360, permitting shutter 252 to be in either the blocking or unblocking positions, as respectively illustrated in FIGS. 12 and 13. When circuit breaker 20 is being levered out from the connect position, and it is between the connect and test positions, as illustrated in FIG. 14, leg 354 will contact cam lobe 360, preventing shutter 252 from pivoting upwardly to the blocking position. Since shutter 252 is held in the actuated position, circuit breaker 20 will be maintained in a trip-free condition by trigger 340 and trigger link 342. When the test position is reached, if the levering crank is removed from crank end 104 of shaft 98, leg member 354 will enter slot 368, allowing shutter 252 to return to the un-actuated position shown in FIG. 8.

Continued levering out from the test to the disconnect positions results in leg 354 contacting cam lobe 358, again maintaining shutter 252 in the actuated position shown in FIG. 9, notwithstanding removal of the levering crank. Upon reaching the disconnect position, removal of the levering crank results in leg 354 entering slot 366, enabling shutter 252 to return to the unactuated position.

Figure 15:
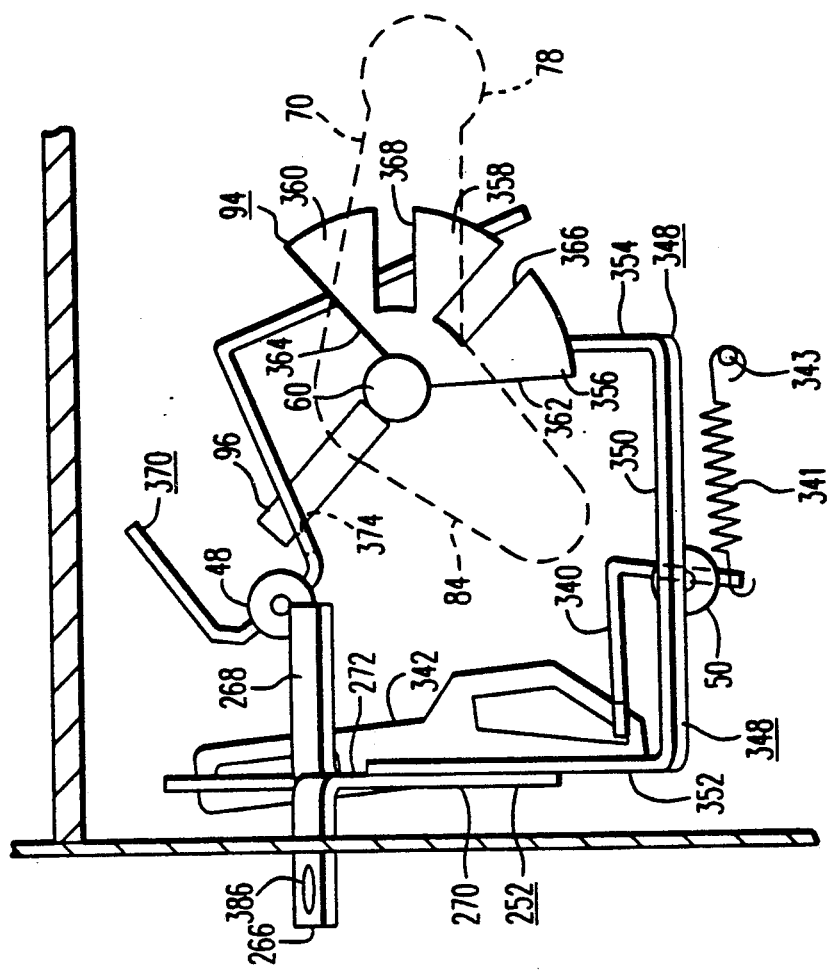
FIG. 15 is a side elevational view of the interlock functions shown in FIG. 9, similar to FIG. 12, except illustrating the interlocks when the associated circuit breaker is between a "disconnect" position and a "remove" position.

Continued levering out from the disconnect position towards the remove position results in leg 354 contacting the first cam lobe 356, as shown in FIG. 15, maintaining shutter in the actuated position if the levering crank is removed. Upon reaching the remove position, removal of the levering crank results in leg 354 being adjacent edge 362 of the first cam lobe 356, allowing shutter 252 to return to the unactuated position shown in FIG. 8.

It is not desirable to have circuit breaker 20 reach the remove position with the closing springs of operating mechanism 26 charged. In a power operated circuit breaker, charging of the closing springs occurs automatically when the circuit breaker reaches the test position. To accomplish the function of discharging the closing springs, as shown in FIG. 12, a close trigger 370 is provided which is fixed to the close shaft 48, with the close shaft being biased counter clockwise by a tension spring 372. Close trigger 370 is provided with an integral extension arm 374, as shown in FIGS. 14 and 15. As circuit breaker 20 is levered outwardly from the disconnect position to the remove position, interlock bar 96, which is fixed to levering-in shaft 60, contacts extension arm 374, as shown in FIG. 15, and rotates close shaft 48 clockwise to a position which discharges the closing springs. Interlock bar 96 then prevents charging of the closing spring while the circuit breaker levering-in mechanism 22 is in the remove position, by maintaining close shaft 48 in the actuated position.

As shown in FIGS. 8 and 9, a padlock plate 376 is slidably mounted on the front panel 28 via a slot 378 in plate 376 and a pair of spaced pins 380 and 381 fixed to panel 28. An outwardly extending tab 382 having an opening 384 therein is vertically aligned with an opening 386 in actuating tab member 266 of shutter 252, when padlock plate 376 is manually moved to the right, when viewing FIGS. 8 and 9. Thus, shutter 252 may be pad locked in either the un-actuated position shown in FIG. 8, or in the trip-free, actuated position shown in FIG. 9.

We claim:

1. In a circuit breaker mounted for movement between a plurality of positions in a compartment having cradles, with the circuit breaker including first and second upstanding side plates, and a levering-in mechanism for rotationally engaging the cradles to selectively make and break electrical contacts associated with the circuit breaker and compartment, a method of assembling the levering-in mechanism in an assembled circuit breaker, characterized by the steps of:
   providing a levering-in sub-assembly which includes a levering shaft,
   providing first and second upwardly open slots in the first and second chassis side plates, with said first and second slots having bottom portions,
   lowering the levering-in sub-assembly into the first and second slots, with the bottom portions of the first and second slots supporting the levering shaft and functioning as first and second half bearing,
   and completing the first and second half bearings by the steps of providing first and second retainer plates having first and second downwardly open slots, respectively, and fastening said first and second retainer plates to the first and second side plates, respectively, such that the levering shaft extends through the downwardly facing slots, to hold the levering shaft at the bottom portions of the first and second slots.

2. In a circuit breaker mounted for movement between a plurality of positions in a compartment having cradles, with the circuit breaker including first and second upstanding side plates and a top plate, and a levering-in mechanism for rotationally engaging the cradles to selectively make and break electrical contacts associated with the circuit breaker and compartment, a method of assembling the levering-in mechanism in an assembled circuit breaker, characterized by the steps of:
   removing the top plate, providing a levering-in sub-assembly which includes a levering shaft, providing first and second upwardly open slots in the first and second chassis side plates, with said first and second slots having bottom portions, lowering the levering-in sub-assembly into the first and second slots, with the bottom portions of the first and second slots supporting the levering shaft and functioning as first and second half bearings, and completing the first and second half bearings by the steps of providing first and second retainer plates having first and second downwardly open slots, respectively, and fastening said first and second retainer plates to the first and second side plates, respectively, such that the levering shaft extends through the downwardly facing slots, to hold the levering shaft at the bottom portions of the first and second slots, replacing the top plate following the lowering step, and attaching a predetermined portion of the levering-in sub-assembly to the top plate.

3. In a circuit breaker mounted for movement between a plurality of positions in a compartment having cradles, with the circuit breaker including first and second upstanding side plates, and a levering-in mechanism for rotationally engaging the cradles to selectively make and break electrical contacts associated with the circuit breaker and compartment, a method of assembling the levering-in mechanism in an assembled circuit breaker, characterized by the steps of:

providing a levering-in sub-assembly which includes a levering shaft having first and second ends, providing first and second upwardly open slots in the first and second chassis side plates, with said first and second slots having bottom portions, lowering the levering-in sub-assembly into the first and second slots, with the bottom portions of the first and second slots supporting the levering shaft and functioning as first and second half bearings, and completing the first and second half bearings by the steps of providing first and second retainer plates having first and second downwardly open slots, respectively, and fastening said first and second retainer plates to the first and second side plates, respectively, such that the levering shaft extends through the downwardly facing slots, to hold the levering shaft at the bottom portions of the first and second slots, said step of providing the levering-in sub-assembly welding first and second crank arms to the first and second ends, respectively, of the levering shaft, and welding first and second drive links in spaced relation, intermediate the first and second ends of the levering shaft, wherein the first and second crank arms are adjacent to outer surfaces of the first and second chassis side plates, and the first and second drive links are between the first and second chassis side plates, following the step of lowering the levering-in sub-assembly into the first and second slots.

4. The method of claim 3 including the step of welding at least one interlock member to the levering shaft.

5. A circuit breaker comprising a chassis having first and second side plates, a levering-in mechanism for moving the circuit breaker between a plurality of positions in a compartment having cradles to selectively make and break electrical contacts associated with the circuit breaker and compartment, with the levering-in mechanism translating means for translating rotation of the first shaft to rotation of the second shaft, rotational engagement with the cradles, and movement of the chassis relative to the compartment, characterized by:

said first and second side plates each defining an upwardly open slot having a bottom portion, with said bottom portions journally supporting the second shaft, and first and second retainer plates respectively fixed to the first and second chassis side plates, with said first and second retainer plates defining downwardly open slots through which the second shaft extends.

6. The circuit breaker of claim 5 wherein the chassis includes a top plate, and including means fixing a predetermined portion of the levering-in mechanism to said top plate.

7. The circuit breaker of claim 6 wherein the translating means includes a bracket member having a U-shaped configuration, including a bight and first and second depending leg portions which define openings through which the first shaft extends, with the predetermined portion of the levering-in mechanism which is fixed to the top plate being the bight of said bracket member.

8. The circuit breaker of claim 5 wherein the translating means includes a bracket member having a U-shaped configuration, including a bight and first and second depending leg portions which define openings through which the first shaft extends, said first shaft having a threaded portion, and including a traveling nut on said threaded portion which is disposed between the first and second leg portions of said bracket member, a bushing member fixed to said first shaft member, with said bushing member being disposed within the opening defined by the second leg portion of the bracket member such that the bushing member floats therein, receiving radial support by the second leg portion without restriction on axial movement, whereby movement of the traveling nut against the floating bushing applies no force to the second leg portion.

9. A circuit breaker having a levering-in mechanism which includes first and second shafts having orthogonal axes, and translating means for translating rotation of the first shaft to rotation of the second shaft, characterized by:

said levering-in mechanism including a bracket member having a U-shaped configuration, including a bight and first and second depending leg portions which define openings through which the first shaft extends, said first shaft having a threaded portion, said second shaft having first and second drive links fixed thereto, said translating means including a traveling nut on the threaded portion of the first shaft which is disposed between the first and second leg portions of said bracket member, and first and second link members pivotally fixed to the traveling nut which are respectively pivotally linked to the first and second drive links on the second shaft, whereby rotation of the first shaft moves the traveling nut along the threaded portion of the first shaft and rotates the second shaft via the first and second link means and the first and second drive links, and a bushing member fixed to said first shaft member, with said bushing member being disposed within the opening defined by the second leg portion of the bracket member such that the bushing member floats therein, receiving radial support by the second leg portion without restriction on axial movement, whereby movement of the traveling nut against the floating bushing applies no force to the second leg portion.

10. The circuit breaker of claim 9 wherein the second leg portion of the bracket member includes a portion which extends outwardly from the bight, and wherein the traveling nut includes a stud member fixed thereto, and including a position indicator having first and second ends, with the first end being the indicating end, wherein the second end is supported by the outwardly extending portion of the second leg portion, and wherein the position indicator is further supported between the first and second ends by the stud member on the traveling nut.

11. The circuit breaker of claim 10 including first and second crank arms welded to the second shaft, and wherein the first and second drive links are welded to the second shaft, to form a weldment comprising the second shaft, the first and second drive links, and the first and second crank arms.

12. The circuit breaker of claim 11 including first and second stud members fixed to the traveling nut, with the first and second link members respectively linking the first stud member and first drive link, and the second stud member and second drive link.

13. The circuit breaker of claim 12 wherein at least one of the first and second link members includes a surface disposed closely adjacent the traveling nut, preventing rotation of the traveling nut.

14. A circuit breaker having electrical contacts operable between open and closed positions, a circuit breaker chassis, a levering-in mechanism supported by the chassis which includes first and second shafts having orthogonal axes, with the first shaft having an actuating end for rotating the first shaft, translating means for translating rotation of the first shaft to rotation of the second shaft, with rotation of the second shaft rotating crank arms which function to move the circuit breaker between predetermined positions relative to a circuit breaker compartment and associated electrical contacts, an operating mechanism having closing means and tripping means for respectively closing and tripping the circuit breaker, and a shutter having first and second positions which respectively block and enable access to the actuating end of the first shaft, characterized by:

the shutter having a flat elongated body portion having first and second sides, first and second longitudinal ends, an actuating tab adjacent to the second end which extends outwardly from the first side, and a pivot point intermediate the ends, means pivotally mounting the pivot point of said shutter to the circuit breaker chassis, whereby the shutter is pivotable between the first and second positions, and means linking the first end of the shutter with the trip means of the operating mechanism, whereby movement of the actuating tab and shutter from the first to the second position moves the first end of the shutter and actuates the trip means of the operating mechanism to trip the circuit breaker.

15. The circuit breaker of claim 14 wherein the trip means of the operating mechanism includes a trip shaft which opens the circuit breaker when rotated, with the means linking the second end of the shutter with the operating mechanism being linked to the trip shaft, whereby movement of the shutter rotates the trip shaft.

16. The circuit breaker of claim 14 including a lock tab, and means slidably fixing the lock tab to the chassis such that the lock tab has blocking and unblocking positions relative to the actuating tab of the shutter, with the blocking position of the lock tab preventing actuation of the shutter from the first position to the second position.

17. The circuit breaker of claim 14 wherein the circuit breaker chassis includes first and second metallic plate members which support the operating mechanism, and the means pivotally mounting the shutter to the circuit breaker chassis includes a support opening defined by one of the first and second metallic plate members through which the shutter extends, and the pivot point on the shutter is defined by a notch on the shutter which is supported by the portion of the metallic plate member which defines the support opening.

18. The circuit breaker of claim 14 including a substantially U-shaped member having a first and second legs, with the first leg being fixed to the second side of the shutter, and a cam member fixed to the second shaft, wherein the second leg of the U-shaped member and the cam member co-operatively provide an interlock function which prevents the shutter from moving from the second position to the first position when the circuit breaker is not in one of the predetermined positions relative to the circuit breaker compartment.

19. The circuit breaker of claim 14 wherein the predetermined positions of the circuit breaker include "remove" and "connect" positions, and the operating mechanism includes a closing spring, which is charged by the operating mechanism prior to closing the circuit breaker, and a close shaft which is rotated to discharge the closing spring, and including an interlock bar fixed to the second shaft, whereby rotation of the second shaft to move the circuit breaker toward the remove position causes the interlock bar to rotate the close shaft to discharge said closing spring.

20. The circuit breaker of claim 14 wherein the circuit breaker has stationary contact means and a movable contact assembly pivotable between open and closed positions relative to the stationary contact means, and including an interlock tab on the shutter which extends outwardly from the second side thereof, and including an interlock link fastened to said movable contact means, with said interlock link having first and second positions responsive to open and closed positions, respectively, of the movable contact assembly, with said second position being a blocking position relative to the interlock tab of the shutter, preventing operation of the shutter from the first to the second position when the circuit breaker is closed.

21. The circuit breaker of claim 20 wherein the interlock link has first and second ends and an intermediate interlock finger, and the movable contact assembly includes insulative phase barriers, and means pivotally fixing the first end of the interlock link to an insulative phase barrier, such that the interlock finger moves into a blocking position relative to the interlock tab when the circuit breaker is closed.

22. The circuit breaker of claim 21 including an auxiliary switch, with the second end of the interlock link being pivotally fixed to the auxiliary switch, such that the auxiliary switch electrically indicates whether the circuit breaker is open or closed.

23. The circuit breaker of claim 21 including a mechanically operated open-close indicator, and means interconnecting the interlock link and open-close indicator such that movement of the interlock link moves the open-close indicator to manually indicate the condition of the circuit breaker contacts.

* * * * *